Dec. 26, 1950  G. B. REEL  2,535,867
RETURN DEVICE FOR PICKER STICKS
Filed Dec. 8, 1949  2 Sheets-Sheet 1
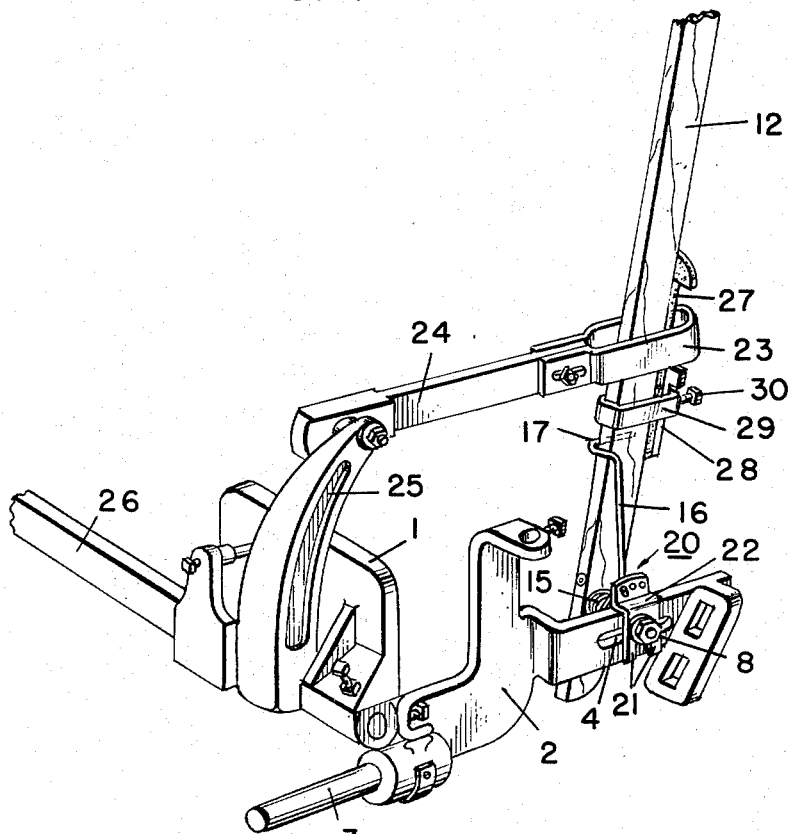
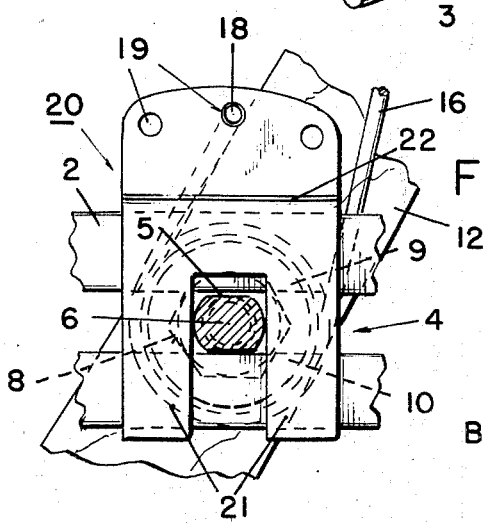
Inventor
G. B. REEL,
By J. Hanson Boyden,
Attorney

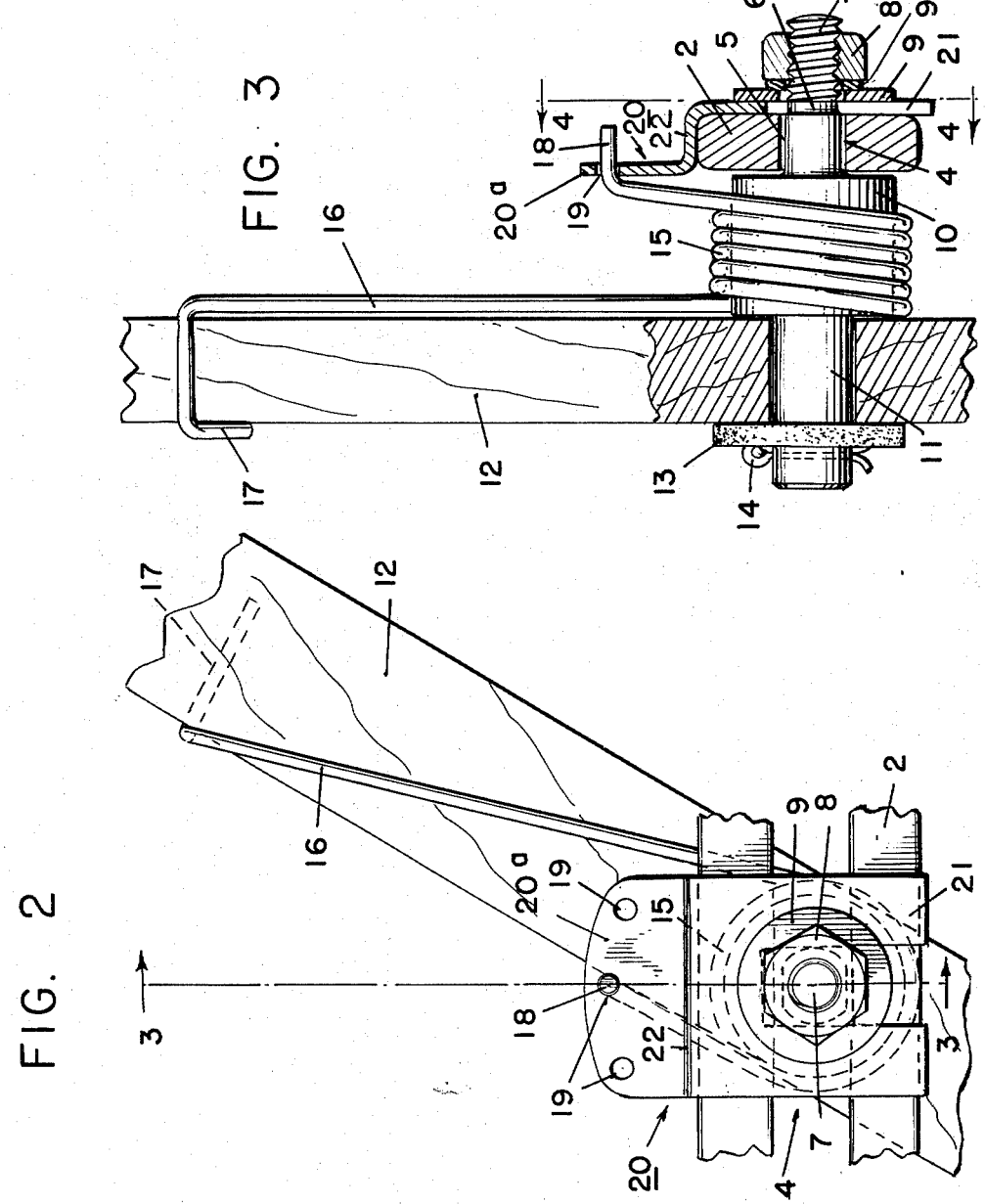

Patented Dec. 26, 1950

2,535,867

UNITED STATES PATENT OFFICE 2,535,867

RETURN DEVICE FOR PICKER STICKS

Grover B. Reel, Shelby, N. C.

Application December 8, 1949, Serial No. 131,820

6 Claims. (Cl. 139—149)

This invention relates to picker sticks for looms, and more particularly to spring devices for returning the picker stick after each shuttle-actuating movement.

An object of the invention is to simplify and improve the construction of such spring devices so that certain customary parts are eliminated, and the cost thus reduced.

Another object is to provide a spring device which may be readily applied to many existing looms without making any change whatever in their construction.

In looms as hitherto constructed, and now in common use, it sometimes happens that the lug clamp becomes loose and slips down, thus allowing the sweep stick to fall and break or damage other parts of the loom below it. A still further object of the invention is to devise a spring so constructed that it will at the same time serve as a guard to prevent the lug clamp from slipping down.

In order that the invention may be readily understood, reference is had to the accompanying drawings, forming part of this specification and in which:

Fig. 1 is a perspective view showing a portion of a well known type of loom, including the picker stick, with my improved spring device applied thereto;

Fig. 2 is a side elevation on an enlarged scale of the lower end of the picker stick showing my improved spring device;

Fig. 3 is a vertical section substantially on the line 3—3 of Fig. 2 looking in the direction of the arrows; and Fig. 4 is a fragmentary vertical section substantially on the line 4—4 of Fig. 3 looking in the direction of the arrows.

Referring to the drawings in detail, 1 designates the usual picking shaft bearing and 2 the picker foot mounted on the rocker shaft 3. The picker foot includes a horizontally extending portion, substantially rectangular in cross section and having a slot 4 and a straight upper edge.

The usual pivot stud has a portion provided with flattened sides 5 extending through and fitting within the slot 4, a portion 6 of reduced diameter adjacent the portion having the flattened sides, and an end threaded portion 7 on which fits a clamping nut 8. This nut 8 preferably bears against a locking washer 9a which in turn engages a larger washer 9.

The pivot stud also has an enlarged portion or barrel 10 and a portion 11 of reduced diameter on which the picker stick 12 is pivotally mounted. The picker stick is held in position by means of a suitable washer 13 and cotter pin 14.

My improved device comprises a helical spring 15 coiled around the enlarged barrel portion 10 of the pivot stud and located between the picker foot 2 and the picker stick 12, as clearly shown in Fig. 3. This spring is provided at one end with a relatively long arm 16 extending upwardly along the picker stick and bent at its end to form a hook 17 which extends around the edge of the picker stick and engages the rear face thereof opposite the arm 16.

The other end of the spring is relatively short and terminates in a spur 18 adapted to engage in any one of a series of holes 19 formed in a bracket 20. This bracket has a bifurcated lower portion 21 adapted to straddle the portion 6 of the pivot stud and to lie flat against the outer face of the picker foot 2. This bifurcated portion of the bracket 20 is securely clamped by the nut 8 between the washer 9 and the picker foot 2.

The bracket 20 has a transversely extending shoulder 22 which is adapted to lie closely against the upper edge of the rectangular portion of the picker foot. Extending upwardly from the shoulder 22 is an off-set portion 20a, in which the holes 19 are formed, the shoulder being of such depth that the off-set portion 20a lies substantially flush with the inner face of the picker foot 2.

By virtue of the fact that the shoulder 22 of the bracket rests firmly upon the upper edge of the picker foot, the bracket is securely held against rotation about the pivot stud and thus is capable of sustaining the torsion or thrust exerted against it by the end 18 of the spring 15. By setting the spur 18 in a different hole 19 the tension of the spring may be adjusted as desired.

From the foregoing it will be seen that my improved spring device consists of only two parts, namely the spring 15 and the bracket 20, and these parts are constructed to be applied to a pivot stud and picker foot of standard construction, without change, and without the use of tools, other than a wrench.

It will be obvious that since one end of the torsion spring 15 is anchored to the bracket 20, the other end 16 thereof will exert a force against the picker stick serving to return it after each power stroke. It will be observed that my improved spring device is especially simple and compact in construction and that it may be easily applied to existing types of looms in place of the spring device with which picker sticks are usually provided.

Referring to Fig. 1, 23 designates the usual or any suitable type of lug, connected by sweep stick 24 with the picker shaft arm 25 mounted on the picker shaft 26. Associated with the lug 23 is a lower strap 27 held in place by a plate 28 and lug clamp 29 which embraces the picker stick, and is secured by a set screw 30.

It sometimes hapepns that this lug clamp 29 and power strap become loose. In constructions previously employed, this allows the lug 23 to slip down low enough to come in contact with the box lifting lever and selective fingers (not shown) and break or damage the same. With my improved device, the hook 17 at the upper end of the arm 16 acts as a stop to limit the downward movement of the lug clamp, should it become loosened and tend to slip. Thus damage to the box lifting lever and selective fingers is prevented.

I claim:

1. In picking mechanism for looms, the combination with a picker foot having an opening, a pivot stud extending through said opening, a clamping nut for securing said stud in position, and a picker stick pivotally mounted on said stud and spaced from said foot, of a spring coiled around said stud between said stick and foot, said spring having at one end an arm engaging over the edge of the picker stick, and means for anchoring the other end of said spring to said picker foot.

2. In picking mechanism for looms, the combination with a picker foot having an opening, a pivot stud extending through said opening, a clamping nut for securing said stud in position, and a picker stick pivotally mounted on said stud and spaced from said foot, of a spring coiled around said stud between said stick and foot, said spring having at one end an arm engaging over the edge of the picker stick, and a bracket having a bifurcated portion fitting over said stud and interposed between said foot and nut, the other end of said spring being anchored to said bracket.

3. In picking mechanism for looms, the combination with a picker foot comprising a portion of substantially rectangular cross section having an opening therein, a pivot stud extending through said opening, a clamping nut for securing said stud in position, and a picker stick pivotally mounted on said stud and spaced from said foot, of a spring coiled around said stud between said stick and foot, one end of said spring bearing against said picker stick, and a bracket having a bifurcated portion fitting over said stud and interposed between the flat face of said rectangular portion of said foot and said clamping nut, said bracket having a shoulder engaging the edge of said rectangular portion, the other end of said spring being anchored to said bracket.

4. In picking mechanism for looms, the combination with a picker foot comprising a portion of substantially rectangular cross section having an opening therein, a pivot stud extending through said opening, a clamping nut for securing said stud in position, and a picker stick pivotally mounted on said stud and spaced from said foot, of a spring coiled around said stud between said stick and foot, and a bracket having a bifurcated portion fitting over said stud and interposed between the flat outer face of the rectangular portion of said foot and said clamping nut, said bracket having an off-set portion lying substantially in the plane of the inner face of the rectangular portion of said foot, the portion uniting said bifurcated and off-set portions of the bracket constituting a shoulder engaging the edge of said foot, one end of said spring bearing against said picker stick and the other end being anchored to the off-set portion of said bracket.

5. In picking mechanism for looms the combination with a picker foot having an opening, a pivot stud extending through said opening, a picker stick pivotally mounted on said stud and spaced from said foot, and a lug and lug clamp surrounding said picker stick, of a spring coiled around said stud between said stick and foot, and means for anchoring one end of said spring to said picker foot, said spring having at the other end an arm extending alongside said picker stick, the extremity of said arm engaging over the edge of said picker stick at a point below and adjacent said lug clamp and constituting a stop to limit the downward movement of said clamp and associated parts.

6. As an article of manufacture, a spring device for the picker sticks of looms, consisting, in combination, of a coiled spring adapted to surround the stud by which a picker stick is pivotally mounted on the picker foot, one end of said spring having an arm shaped at its extremity to engage over the edge of the picker stick, and a bracket to which the other end of said spring is detachably secured, said bracket having a bifurcated portion adapted to fit over the pivot stud at a point between the picker foot and the usual clamping nut, and said bracket also having a shoulder adapted to engage the edge of the picker foot and thus be held against rotation with respect thereto.

GROVER B. REEL.

REFERENCES CITED

The following references are of record in the file of this patent:

UNITED STATES PATENTS

| Number | Name | Date |
|---|---|---|
| 131,354 | Knowles | Sept. 17, 1872 |
| 1,013,335 | Tucker | Jan. 2, 1912 |
| 1,251,744 | Bounds et al. | Jan. 1, 1918 |
| 1,406,544 | Davitt | Feb. 14, 1922 |
| 1,797,952 | Gargolinski | Mar. 24, 1931 |